United States Patent [19]
Obara

[11] Patent Number: 6,078,466
[45] Date of Patent: Jun. 20, 2000

[54] MAGNETIC DISK UNIT

[75] Inventor: Rikuro Obara, Nagano-ken, Japan

[73] Assignee: Minebea Kabushiki-kaisha, Nagano-ken, Japan

[21] Appl. No.: 08/200,455

[22] Filed: Feb. 23, 1994

[30] Foreign Application Priority Data

Feb. 23, 1993 [JP] Japan .................................. 5-057871

[51] Int. Cl.[7] .............................. G11B 17/02; H02K 7/08
[52] U.S. Cl. ...................................... 360/99.08; 310/67 R
[58] Field of Search .............................. 360/99.08, 99.04, 360/98.07; 369/258, 261, 266, 269; 310/51, 43, 90, 67 R, 268

[56] References Cited

U.S. PATENT DOCUMENTS

| | | | |
|---|---|---|---|
| 4,118,038 | 10/1978 | Watanabe | 274/9 B |
| 4,900,958 | 2/1990 | Kitahara et al. | 310/67 R |
| 5,045,738 | 9/1991 | Hishida et al. | 369/269 |
| 5,138,209 | 8/1992 | Chuta et al. | 310/51 |
| 5,157,295 | 10/1992 | Stefansky et al. | 310/67 R |
| 5,177,650 | 1/1993 | Jabbari et al. | 360/99.08 |
| 5,200,866 | 4/1993 | Frugé et al. | 360/99.08 |
| 5,214,326 | 5/1993 | Yonei | 310/67 R |
| 5,334,895 | 8/1994 | Morioka et al. | 310/67 R |
| 5,352,947 | 10/1994 | MacLeod | 360/99.08 |
| 5,391,952 | 2/1995 | Simazu et al. | 310/51 |

FOREIGN PATENT DOCUMENTS

| | | |
|---|---|---|
| 0425312 | 5/1991 | European Pat. Off. . |
| 3540363 | 6/1986 | Germany ............ 360/99.08 |
| 61-112547 | 5/1986 | Japan . |
| 4067356 | 3/1992 | Japan . |
| 4265652 | 9/1992 | Japan . |
| WO 91/19344 | 12/1991 | WIPO . |

*Primary Examiner*—David L. Ometz
*Attorney, Agent, or Firm*—Lowe, Hauptman, Gopstein, Gilman & Berner

[57] ABSTRACT

A magnetic disk unit of the present invention has a construction in which: a rotor, on which a magnetic disk is loaded, is integrally formed with a sleeve portion of a ball bearing unit, or with a spindle of a spindle motor for driving the disk, or with an inner or an outer race of the ball bearing unit in a disk drive unit of the magnetic disk unit, so that: alignment operations of the rotor with the ball bearing unit are eliminated in assembling operations of the magnetic disk unit; and, the rotor is free from radial vibrations to improve the disk in recording density and reliability, whereby the number of parts of the magnetic disk unit and the number of assembling operation or steps of the magnetic disk unit are reduced, which leads to reduction of the manufacturing cost of the magnetic disk unit.

9 Claims, 5 Drawing Sheets

MAGNETIC DISK UNIT

BACKGROUND OF THE INVENTION

1. Field of the Invention

The present invention relates mainly to a magnetic disk unit employed in office automation instruments.

2. Description of the Prior Art

In a conventional disk drive unit of the magnetic disk unit, as shown in FIG. 12, a rotor on which a magnetic disk is loaded is rotatably driven by a motor which is generally constructed of a spindle motor.

The spindle motor has a spindle mounted rotatably in a ball bearing unit to prevent the rotor's axial and radial vibrations. In the ball bearing unit, the spindle is mounted in a sleeve through a radial ball bearing constructed of an inner and an outer ring, and a plurality of balls disposed between these ring races.

In the conventional disk drive unit, the ball bearing unit and the rotor are separately constructed from each other, which increases the number of parts and the number of assembling works thereof.

Further, in such assembling works, it is necessary to mount the spindle on the rotor and to align the sleeve with a center of the ball bearing unit. Furthermore, such alignment work of the sleeve in center must be performed in a precise manner. Also required to prevent the axial and radial vibrations of the rotor are highly developed technologies. These requirements increase production costs of the magnetic disk unit.

In addition, in the conventional spindle motor of the disk drive unit, motor parts are separately constructed from the ball bearing unit.

Consequently, also in this respect, the number of parts and the number of assembling works are increased in the conventional disk drive unit. In addition, in assembling works of the disk drive unit, each of alignment works of the motor's parts with the ball bearing unit must be performed in a precise manner. These requirements increase manufacturing costs of the magnetic disk unit.

SUMMARY OF THE INVENTION

It is an object of the present invention to provide a magnetic disk unit provided with a precise disk drive unit in which a part of a ball bearing unit is integrally formed with a rotor of the disk drive unit to facilitate assembling works of the disk unit, which reduces manufacturing costs of the disk unit.

It is another object of the present invention to provide a magnetic disk unit provided with a precise disk drive unit in which a part of a disk drive motor is integrally formed with a sleeve portion of a main body of a ball bearing unit, or with a spindle of a motor, or with an inner or an outer ring of the ball bearing unit to facilitate assembling works of the disk unit, which reduces manufacturing costs of the disk unit.

The above objects of the present invention are accomplished by providing:

In a magnetic disk unit comprising a disk drive unit 22 in which a rotor 9 on which a magnetic disk 18 is loaded is rotatably driven by a motor provided with a spindle 5 which is rotatably mounted in a ball bearing unit which is constructed of: a sleeve portion 10 concentrically surrounding the spindle 5; and, a radial ball bearing disposed inside the sleeve portion 10, the improvement wherein the sleeve portion 10 of the ball bearing unit is integrally formed with the rotor 9 in a central portion of a lower surface of the rotor 9 through a molding process.

As is clear from the above, the magnetic disk unit of the present invention is characterized in that the rotor is integrally formed with the sleeve portion of the ball bearing unit, or with the spindle of the motor, or with the inner or the outer ring of the ball bearing unit in the disk drive unit.

The magnetic disk unit of the present invention is further characterized in that the yoke holder of the disk drive motor is integrally formed with the sleeve portion of the ball bearing unit, or with the spindle of the motor, or with the inner or the outer ring of the ball bearing unit.

DESCRIPTION OF THE PREFERRED EMBODIMENTS

Hereinbelow, the present invention will be described in detail with reference to embodiments of a magnetic disk unit of the present invention shown in the accompanying drawings.

Figure 1:
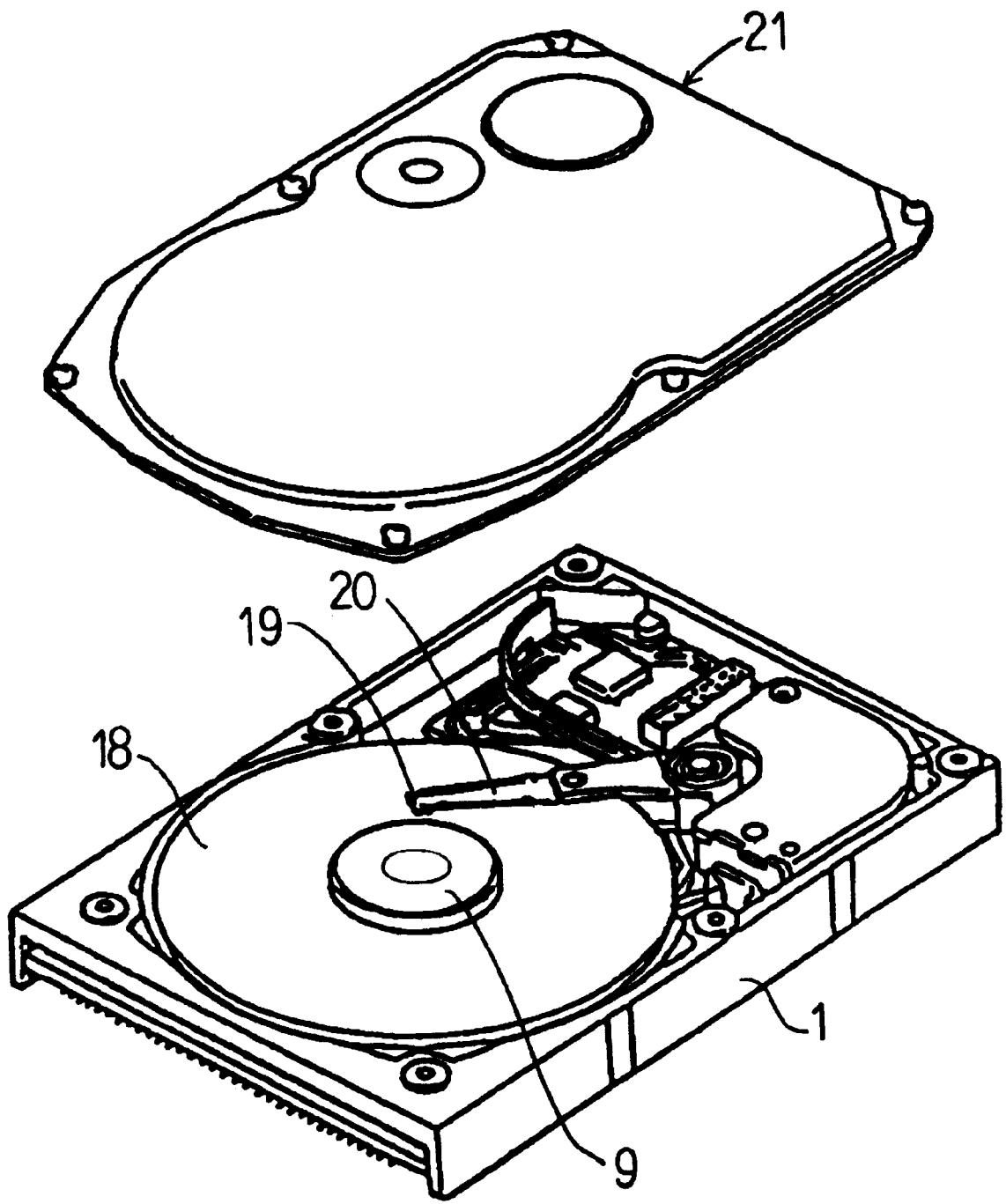
FIG. 1 is a partially exploded perspective view of the magnetic disk unit of the present invention.
Figure 2:
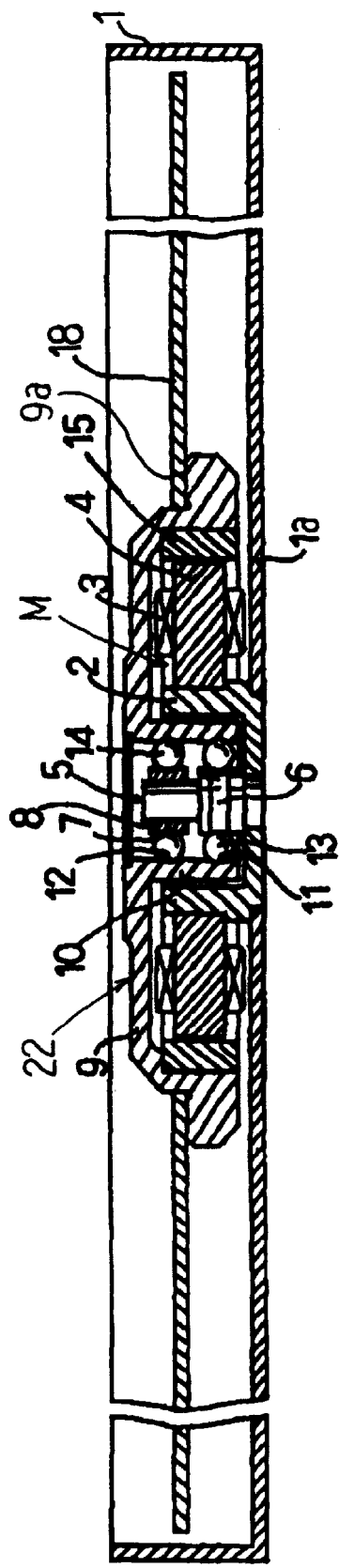
FIG. 2 is a longitudinal sectional view of a first embodiment of the disk drive unit of the magnetic disk unit of the present invention.

FIG. 1 is a partially exploded perspective view of a first embodiment of a magnetic disk unit of the present invention, the disk unit employing an outer-rotor type spindle motor M which belongs to the applicant's company of the subject application. FIG. 2 is a longitudinal sectional view of a disk drive unit 22 of the magnetic disk unit of the present invention.

In FIGS. 1 and 2, the reference numeral 1 denotes a casing of the magnetic disk unit. The casing 1 is provided with the outer-rotor type spindle motor M which has the following construction.

Namely, a sleeve-like yoke holder 2 provided with a bottom portion is mounted on a base portion 1a of the casing 1. Disposed around the yoke holder 2 is a stator yoke 4 which is wound with an energizing coil 3.

A spindle 5 has its lower portion fixedly mounted in a center hole of the bottom portion of the yoke holder 2 and has its upper portion formed into a small-diameter shaft portion, so that the spindle 5 is constructed of a lower large-diameter shaft portion and the upper small-diameter shaft portion to form a stepped shaft.

Formed in an outer peripheral portion of the lower large-diameter shaft portion of the spindle 5 is a ball-running groove 6. An inner ring 8 of the ball bearing unit is fitted to the small-diameter shaft portion of the spindle 5, and provided with a ball-running groove 7 in its outer peripheral portion.

A sleeve portion 10 for a main body of a ball bearing unit is integrally formed with a rotor 9 and extends downward from a lower surface of a central portion of the rotor 9 on which a magnetic disk 18 is loaded. Formed in an inner surface of the sleeve portion 10 of the rotor 9 are a pair of ball-running grooves 11 and 12 which are oppositely disposed from the ball-running grooves 6 and 7, respectively. The ball-running groove 6 is of the large-diameter shaft portion of the spindle 5, while the ball-running groove 7 is of the inner ring 8 of the ball bearing unit. A plurality of balls 13 are disposed between the ball-running grooves 6 and 11, while a plurality of balls 14 are disposed between the ball-running grooves 7 and 12. As is clear from the above description, the main body of the ball bearing unit is constructed of the sleeve portion 10 of the rotor 9, balls 13 and 14 and the ball-running grooves 6 and 7 so that the rotor 9 is rotatably mounted on the spindle 5.

Incidentally, in the drawings, the reference numeral 15 denotes a magnet which is mounted on an inner surface of a flange portion 9a of the rotor 9 so as to be oppositely disposed from the stator yoke 4.

The disk drive unit of this embodiment is characterized in that the sleeve portion 10 of the main body of the ball bearing unit is integrally formed with the rotor 9.

Figure 3:
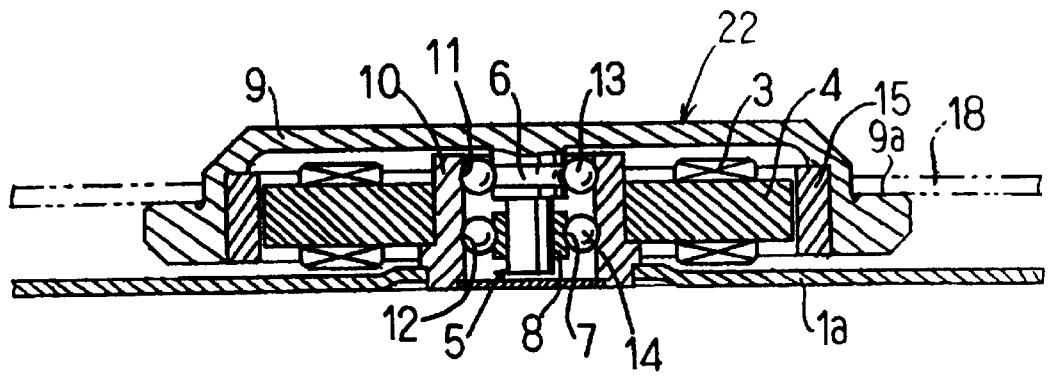
FIG. 3 is a longitudinal sectional view of a second embodiment of the disk drive unit of the magnetic disk unit of the present invention.

In the disk drive unit 22 of a second embodiment of the present invention shown in FIG. 3, the sleeve portion 10 of the main body of the ball bearing unit is provided in the central portion of the base portion 1a of the casing 1. The spindle 5 is integrally formed with the rotor 9 so as to extend downward from a lower surface of the central portion of the rotor 9. As is clear from FIG. 3, the spindle 5 of the second embodiment is provided with an upper large-diameter shaft portion and a lower small-diameter shaft portion to form a stepped shaft, which is reverse in arrangement to that of the first embodiment shown in FIG. 2. However, as is in the second embodiment shown in FIG. 2, in the ball bearing unit: the ball-running groove 6 of the spindle 5 and the ball-running groove 7 of the inner ring 8 of the bearing unit are oppositely disposed from the ball-running grooves 11 and 12 of the sleeve portion 10 of the bearing unit, respectively; and, the balls 13 and 14 are disposed between these ball-running grooves in the same manner as that of the second embodiment.

In this second embodiment of the present invention, as shown in FIG. 3, the stator yoke 4 is mounted on an outer peripheral portion of the sleeve portion 10 of the bearing unit so that the yoke holder 2 of the first embodiment shown in FIG. 2 is eliminated in construction.

The second embodiment of the present invention shown in FIG. 3 is characterized in that the spindle 5 of the main body of the ball bearing unit is integrally formed with the rotor 9.

Figure 4:
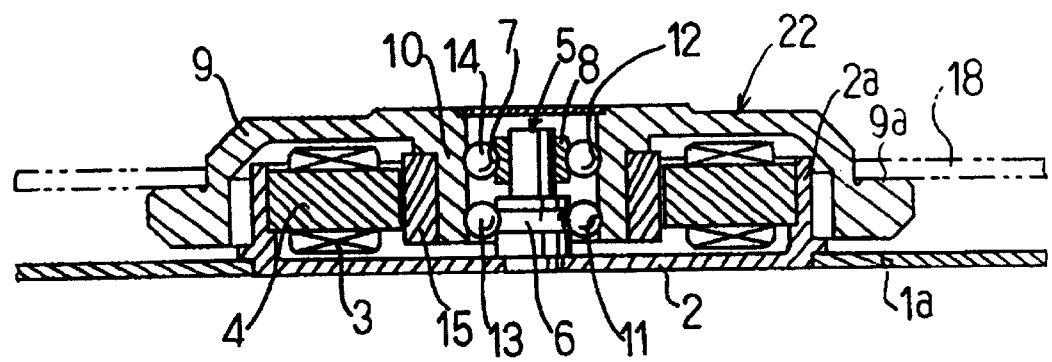
FIG. 4 is a longitudinal sectional view of a third embodiment of the disk drive unit of the magnetic disk unit of the present invention.
Figure 5:
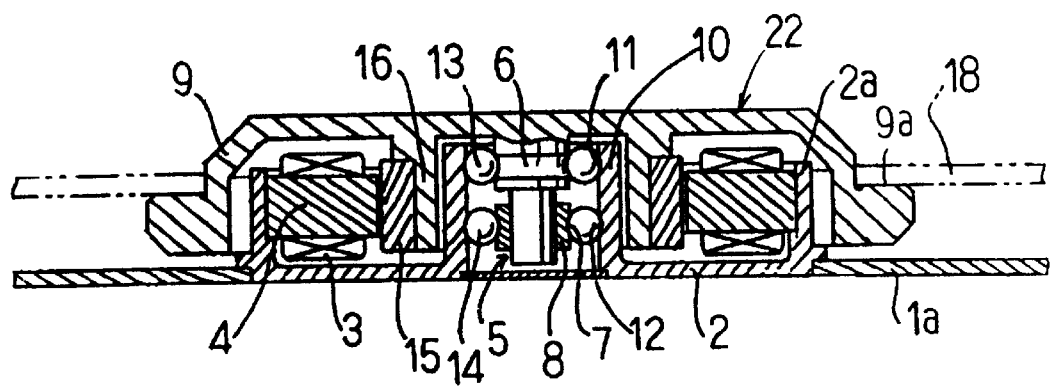
FIG. 5 is a longitudinal sectional view of a fourth embodiment of the disk drive unit of the magnetic disk unit of the present invention.

FIGS. 4 and 5 show a third and a fourth embodiment of the present invention, respectively. In each of these embodiments, the drive motor is constructed of an inner-rotor type spindle motor.

In the third embodiment of the present invention shown in FIG. 4, the spindle 5 constructed of a stepped shaft is mounted in a central hole of a bottom portion of the stator yoke holder 2 so as to extend upward from the bottom portion of the holder 2 which is provided with a sleeve-like rib portion 2a. The stator yoke 4 is mounted on an inner peripheral surface of the rib portion 2a of the stator yoke holder 2.

The disk drive unit of the third embodiment of the present invention shown in FIG. 4 is characterized in that the sleeve portion 10 of the main body of the ball bearing unit is integrally formed with the rotor 9 in the lower surface of the central portion of the rotor 9.

The remaining construction of the main body of the ball bearing unit of the third embodiment shown in FIG. 4 is the same as that of the main body of the ball bearing unit of the first embodiment shown in FIG. 2, with the exception of the magnet 15 which is mounted on the outer peripheral portion of the sleeve portion 10 of the ball bearing unit in the third embodiment as shown in FIG. 4.

The fourth embodiment of the disk drive unit shown in FIG. 5 is characterized in that: the stator yoke holder 2 of the motor is integrally formed with the sleeve portion 10 of the main body of the ball bearing unit; and, the spindle 5 is integrally formed with the rotor 9.

In the fourth embodiment shown in FIG. 5: the stator yoke 4 is mounted on the inner peripheral surface of the rib portion 2a of the holder 2; and, the magnet 15 is mounted on an outer peripheral portion of a sleeve-like magnet holder 16 which is integrally formed with the rotor 9 so as to extend downward from the lower surface of the central portion of the rotor 9.

In the fourth embodiment shown in FIG. 5: the spindle 5 is constructed of a stepped shaft; and, there is no difference in construction of the main body of the ball bearing unit between the fourth embodiment shown in FIG. 5 and the second embodiment shown in FIG. 3.

Incidentally, in FIG. 1: the reference numeral 19 denotes a magnetic head provided in a lower surface of a front-end portion of a head arm 20; and the reference numeral 21 denotes an upper lid of the unit.

In each of the above embodiments of the present invention, though a printed circuit board connected with the coil 3 for actuating the drive motor M is mounted on an inner (or an upper) surface of the base portion 1a of the casing 1, such printed circuit board is omitted in the drawings to clarify the essential parts of the present invention.

Further embodiments of the present invention, will be described in construction, as follows.

Figure 6:
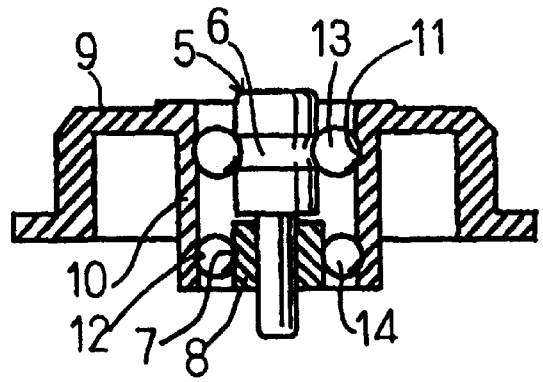
FIG. 6 is a longitudinal sectional view of an embodiment of the disk drive unit of the magnetic disk unit of the present invention, in which the sleeve portion of the ball bearing unit is integrally formed with the rotor of the disk drive unit.
Figure 7:
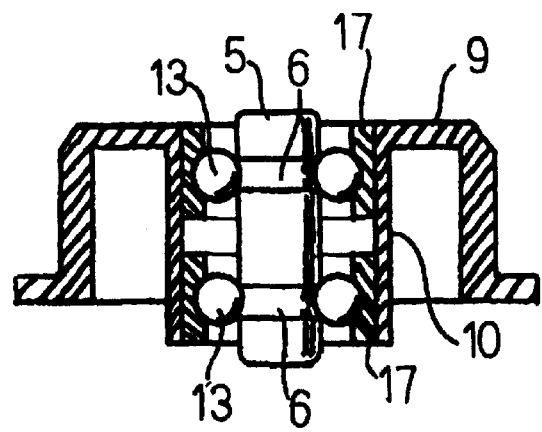
FIG. 7 is a longitudinal sectional view of another embodiment of the disk drive unit of the magnetic disk unit of the present invention, in which the sleeve portion of the ball bearing unit is also integrally formed with the rotor of the disk drive unit.
Figure 8:
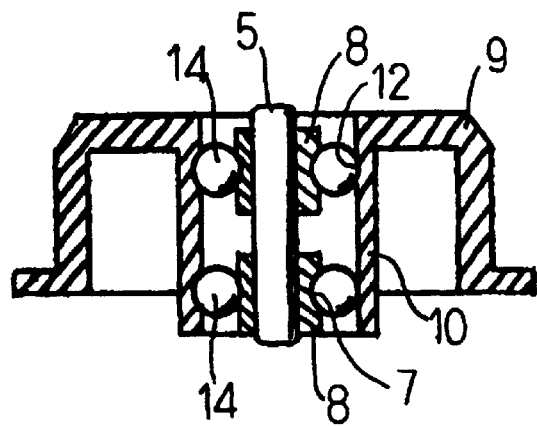
FIG. 8 is a longitudinal sectional view of further another embodiment of the disk drive unit of the magnetic disk unit of the present invention, in which the sleeve portion of the ball bearing unit is also integrally formed with the rotor of the disk drive unit.

FIGS. 6 to 8 show embodiments of the present invention, in each of which embodiments the sleeve portion 10 of the main body of the ball bearing unit is integrally formed with the rotor 9 of the disk drive unit.

Figure 9:
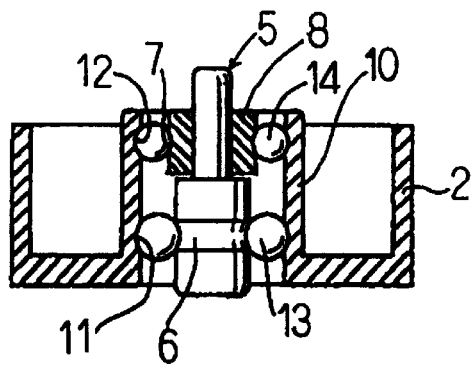
FIG. 9 is a longitudinal sectional view of an embodiment of the disk drive unit of the magnetic disk unit of the present invention, in which the sleeve portion of the ball bearing unit is integrally formed with the yoke holder of the motor of the disk drive unit.
Figure 10:
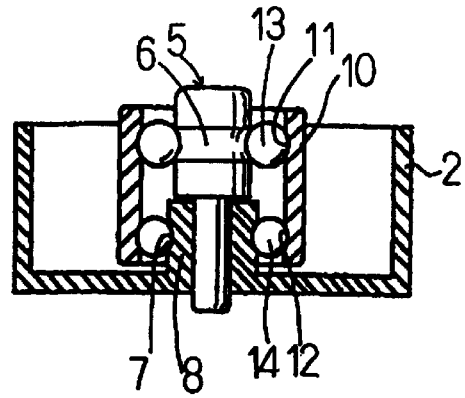
FIG. 10 is a longitudinal sectional view of an embodiment of the disk drive unit of the magnetic disk unit of the present invention, in which the inner ring of the ball bearing unit is integrally formed with the yoke holder of the motor of the disk drive unit.
Figure 11:
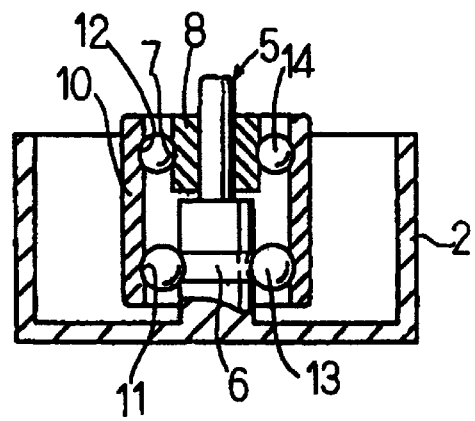
FIG. 11 is a longitudinal sectional view of an embodiment of the disk drive unit of the magnetic disk unit of the present invention, in which the spindle of the ball bearing unit is integrally formed with the yoke holder of the motor of the disk drive unit.
Figure 12:
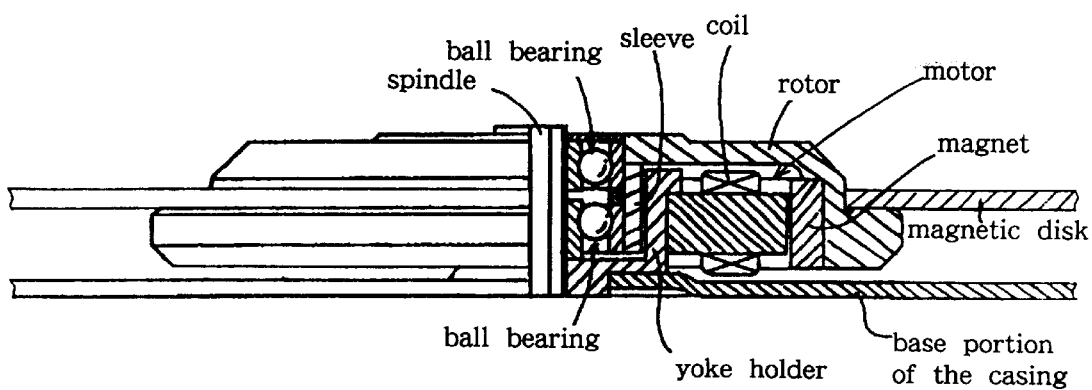
FIG. 12 is a longitudinal sectional view of the conventional disk drive unit of the magnetic disk unit.

FIG. 9 shows another embodiment in which the sleeve portion 10 of the main body of the ball bearing unit is integrally formed with the yoke holder 2 of the drive motor M. FIG. 10 shows further another embodiment of the present invention, in which the inner ring 8 of the main body of the ball bearing unit is integrally formed with the yoke holder 2 of the drive motor M. FIG. 11 shows still further another embodiment of the present invention, in which the spindle 5 of the ball bearing unit is integrally formed with the yoke holder 2 of the drive motor M.

In the disk drive unit of the magnetic disk unit of the present invention, the main body of the ball bearing unit has its spindle or inner ring or outer ring formed integrally with the rotor or the yoke holder of the drive motor. Consequently, in contrast with the conventional drive unit in which a part of the ball bearing unit and the rotor or the yoke holder are separately constructed from each other, the disk drive unit of the present invention is improved in easiness in assembly, and, therefore reduces its manufacturing costs, which are the advantages of the present invention over the prior art.

Further, since the main body of the ball bearing unit has its sleeve portion or spindle or inner ring or outer ring formed integrally with an adequate part of the rotor or the yoke holder, it is possible to eliminate cumbersome alignment works of the spindle with the above parts in assembling works of the disk drive unit, which makes it possible to substantially eliminate the radial vibrations of the spindle in the the disk drive unit of the present invention, which enables the disk drive unit of the present invention to be a precise unit.

Consequently, according to the present invention, it is possible to improve the magnetic disk unit in reliability in data transmission between the magnetic disk and the magnetic head, which makes it possible to improve the magnetic disk in track density. In addition, in the magnetic disk unit of the present invention, since the magnetic disk is substantially not axially vibrated, it is possible to minimize a clearance between the magnetic head and the magnetic disk, which makes it possible to improve the magnetic disk in track recording density. As a result, it is possible for the present invention to provide the magnetic disk unit excellent in reliability and track recording density.

What is claimed is:

1. In a magnetic disk unit comprising a disk drive unit (22), including a rotor (9) on which a magnetic disk (18) is loaded, a motor rotatably driving said rotor (9), the motor having a spindle (5) fixedly mounted on a base portion (1a) of a casing (1), and a ball bearing unit, said ball bearing unit including a sleeve portion (10) concentrically surrounding said spindle (5), the improvement wherein:
said disk unit comprises a one-piece integrally formed unit including therein said rotor (9) and said sleeve portion (10) of said ball bearing unit, wherein said sleeve portion (10) is integrally formed in a central portion of a lower surface of said rotor (9);
said spindle (5) is a stepped shaft having a large-diameter shaft portion and a small-diameter shaft portion;
said small-diameter shaft portion is fitted in an inner ring (8);
said integrally formed sleeve portion (10) operating as double-row outer rings of said ball bearing unit and eliminating outer rings therefrom, and including an inner peripheral surface having a pair of ball-running grooves therein;
a first plurality of balls (14) are disposed between a ball-running groove (7) of an outer peripheral surface of said inner ring and a first ball-running groove (12) of said pair of ball-running grooves of said inner peripheral surface of said sleeve portion (10) and free of any outer ring therefor; and
a second plurality of balls (13) disposed between a ball-running groove (6) of an outer peripheral surface of said large-diameter shaft portion and a second ball-running groove (11) of said pair of ball-running grooves of said inner peripheral surface of said sleeve portion (10) and free of any outer ring therefor, said balls (13) having substantially same diameters as said balls (14).

2. A magnetic disc unit as claimed in claim 1, further comprising:
a yoke holder (2) concentrically surrounding said sleeve portion, said yoke holder disposed in said base portion (1a) of said casing (1);
a stator yoke (4) positioned adjacent said yoke holder (2), said stator yoke having an energizing coil (3); and
a magnet (15) provided at a surface of a flange portion of said rotor (9).

3. A magnetic disc unit as claimed in claim 2, wherein said stator yoke (4) is positioned at an outer peripheral portion of said yoke holder (2),
said flange of said rotor is a peripheral flange thereof, and
said magnet (15) is provided at an inner surface of said peripheral flange of said rotor (9), and outwardly of said stator yoke (4).

4. A magnetic disc unit as claimed in claim 2, wherein:
said magnet (15) is provided at an outer peripheral surface of said sleeve portion (10); and
said yoke holder 2) comprises a sleeve-like yoke holder (2a) surrounding said magnetic yoke; and
said stator yoke (4) is positioned in an inner peripheral surface of said yoke holder (2a).

5. A magnetic disc unit as claimed in claim 1, further comprising:
a magnet (15) provided at an outer peripheral surface of said sleeve portion (10); and
a sleeve-like yoke holder (2a) surrounding said magnet and concentrically arranged with respect to said spindle, said yoke holder disposed in said base portion (1a) of said casing (1); and
a stator yoke (4) positioned at an inner peripheral surface of said yoke holder (2a) and surrounding said magnet (15), said stator yoke having an energizing coil (3).

6. A magnetic disc unit as claimed in claim 1, wherein said ball-running groove (12) of the inner peripheral surface of said sleeve portion (10) eliminates an outer race in said ball bearing unit for said first and second pluralities of balls.

7. A magnetic disc unit as claimed in claim 1, wherein said one-piece integrally formed unit including said rotor (9) and said sleeve portion (10) comprises a one-piece molded unit.

8. A magnetic disc unit as claimed in claim 7, wherein said sleeve portion (10) is molded in said central portion of said lower surface of said rotor (9).

9. In a magnetic disk unit comprising a disk drive unit (22), including a rotor (9) on which a magnetic disk (18) is loaded, a motor rotatably driving said rotor (9), the motor having a spindle (5) fixedly mounted on a base portion 1a of a casing (1), and a ball bearing unit, said ball bearing unit including a sleeve portion (10) concentrically surrounding said spindle (5), the improvement wherein:

said disk unit comprises a one-piece integrally formed unitary element including therein said rotor (9) and said sleeve portion (10) of said ball bearing unit, wherein said unitary element includes said sleeve portion (10) integrally formed in a central portion of a lower surface of said rotor (9);

said spindle (5) is a stepped shaft having a large-diameter shaft portion and a small-diameter shaft portion;

said small-diameter shaft portion is fitted in an inner race (8);

said integrally formed sleeve portion (10) includes an inner peripheral surface having a pair of ball-running grooves therein;

a first plurality of balls (14) are disposed between a ball-running groove (7) of an outer peripheral surface of said inner race and a first ball-running groove (12) of said pair of ball-running grooves of said inner peripheral surface of said sleeve portion (10); and a second plurality of balls (13) disposed between a ball-running groove (6) of an outer peripheral surface of said large-diameter shaft portion and a second ball-running groove (11) of said pair of ball-running grooves of said inner peripheral surface of said sleeve portion (10), said second plurality of balls (13) having substantially same diameters as said first plurality of balls (14).

\* \* \* \* \*